United States Patent [19]
Trumbull et al.

[11] 4,100,743
[45] Jul. 18, 1978

[54] GRAVITY ENGINE

[75] Inventors: Harold E. Trumbull; Howard C. Davis, both of Upper Arlington; Robert A. Yano, Worthington, all of Ohio

[73] Assignee: The Northwestern Mutual Life Insurance Company, Milwaukee, Wis.

[21] Appl. No.: 752,674

[22] Filed: Dec. 20, 1976

[51] Int. Cl.² ............................................. F03G 3/02
[52] U.S. Cl. ..................................................... 60/639
[58] Field of Search .................... 185/4, 5, 6, 7, 27, 185/32; 60/721, 639, 640

[56] References Cited

U.S. PATENT DOCUMENTS

| | | | |
|---|---|---|---|
| 816,437 | 3/1906 | Dackiewicz | 185/4 |
| 1,276,112 | 8/1918 | Reed | 60/507 |
| 3,938,337 | 2/1976 | Fawcett et al. | 60/721 X |
| 4,019,396 | 4/1977 | Frechette | 185/27 X |

*Primary Examiner*—Allen M. Ostrager
*Attorney, Agent, or Firm*—Thomas H. Murray

[57] ABSTRACT

A gravity engine converts one form of energy into another by using the expansion of a fluid medium to propel each of a plurality of bodies upwardly within one of a pair of adjacent vertical passageways. The expansion of a gas, such as steam supplied from a boiler heated by a solar panel, in a chamber and controlled by valves provides the force to propel the bodies against the force of gravity upwardly to the top of the first passageway. A guide directs the bodies from the top of the first passageway to the top of a second passageway wherein the bodies are stacked so that their combined weight acts upon a pocketed drive wheel at the bottom of the second passageway. The drive wheel is coupled to means such as an electrical generator to convert at least a portion of the potential energy of the stacked bodies into another form of energy. The pocketed wheel may also drive a pump used to return condensate water from the engine case to the boiler. The pocketed wheel carries the bodies, e.g., spheroids, from the lower end of the second passageway for passage into the expansion chamber and thence in the next succeeding cycle, along the first vertical passageway.

29 Claims, 11 Drawing Figures

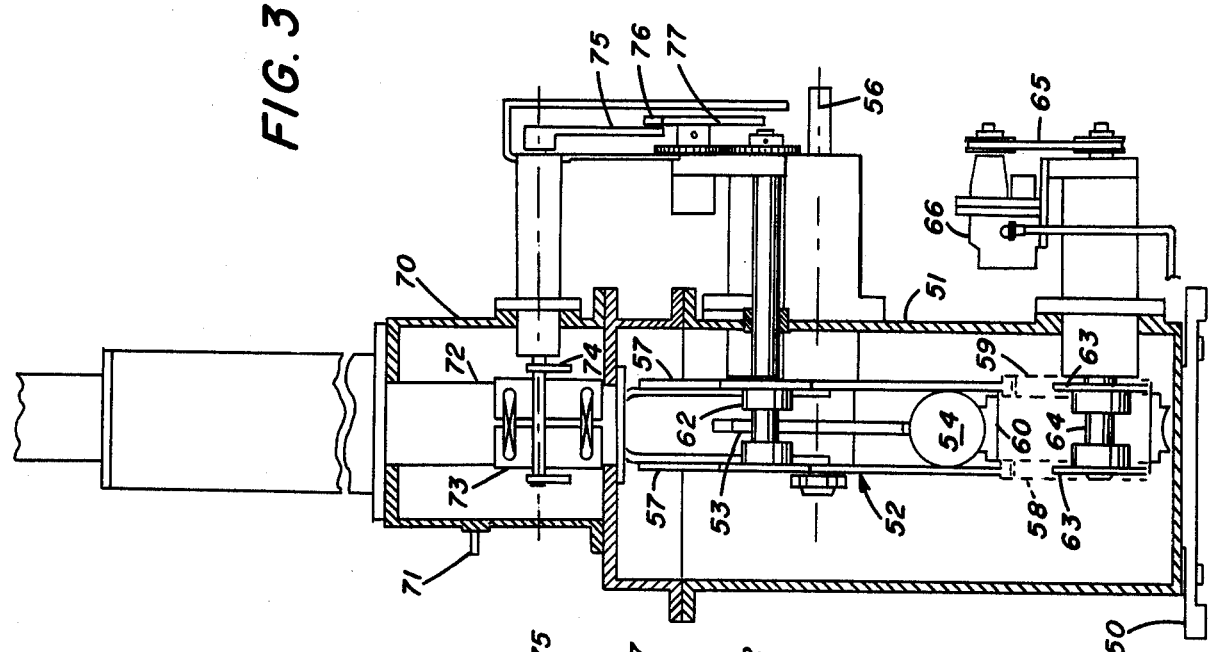
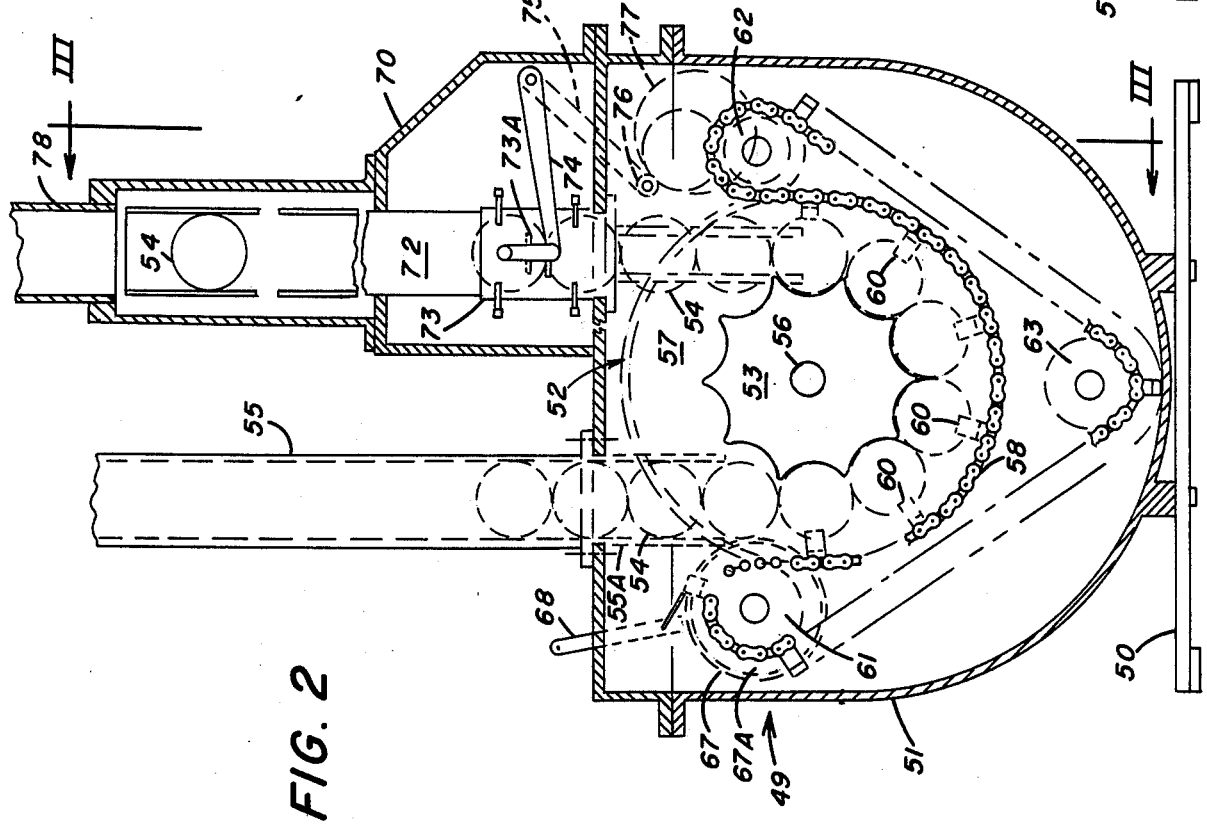

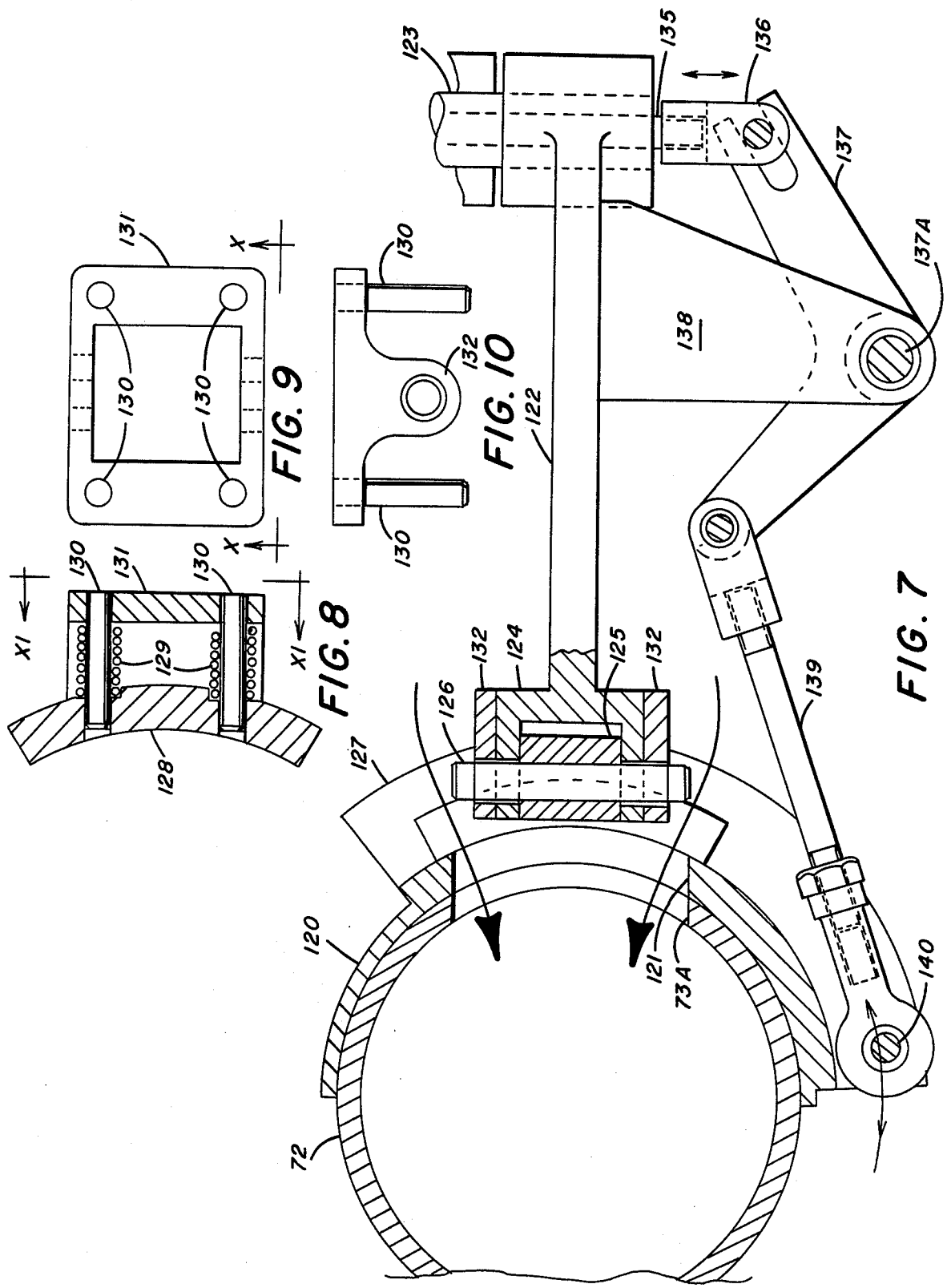

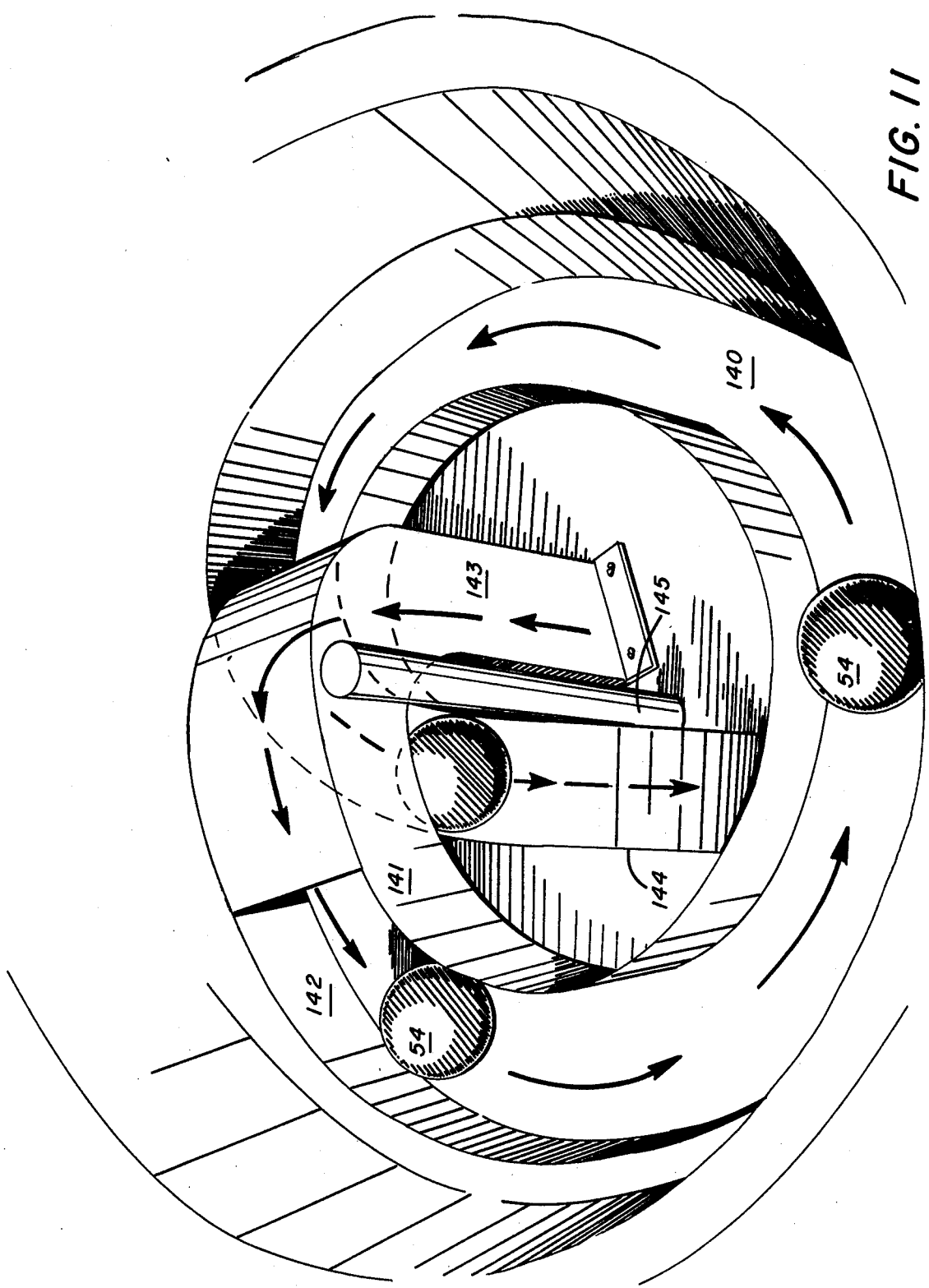

GRAVITY ENGINE

BACKGROUND OF THE INVENTION

This invention relates to a gravity engine of the type wherein bodies, such as spheroids, are accelerated upwardly against the force of gravity by expansion of a gas to a height where the spheroids are collected in a stack within a laterally-spaced vertical passageway having at its lower end a thrustor driven by the spheroids moving under the force of gravity. More particularly, the present invention relates to such a gravity engine wherein a heated gas is introduced into an expander by a valve means which is controlled as a timed function of the rotation of the thrustor by the spheroids.

As is known, systems have been proposed in the past to convert one type of energy into another type by using various thermodynamic cycles, such as Otto, Rankine and Brayton cycles. Most of these systems employ reciprocating pistons; although some, such as those shown in Dutch Pat. No. 65,164 and German Pat. No. 842,645, employ one or more pistons which are forced to travel in one direction in a continuous closed loop by the expansion of a gaseous medium in one region of the closed loop. In the closed-loop system of the prior art, each piston is coupled to a mechanical element which moves with it, the kinetic energy of the moving piston being converted directly into mechanical energy. Such closed-loop systems, while possibly workable, require complicatd mechanisms for coupling the piston or pistons to an associated mechanical element; and this may account for the reason that these systems have not found extensive commerical acceptance.

In U.S. Pat. No. 3,859,789, there is disclosed a method and apparatus for converting one form of energy into another form of energy through the use of a closed, continuous loop passageway containing a plurality of freely-movable, mechanically-unrestrained bodies which travel around the passageway in one direction only. Acceleration of the bodies may be effected by means of an expanding fluid medium supplied externally to the closed-loop passageway or by way of internal combustion. The kinetic energy of the bodies is extracted by a variety of methods including causing the propelled bodies, when formed from mechanically-permeable materil, to pass through an electromagnetic field to convert some of the kinetic energy to electrical energy. Kinetic energy is also extracted by compressing the fluid between the bodies to provide energy in the form of compressed fluid. When expansion of a gas is used to propel the bodies of this type of energy converter, the bodies pass through a region where the gas between them is compressed preparatory to a succeeding cycle of operation. The average gas pressure in the closed-loop passageway is relatively high. In the gravity engine of the present invention, the bodies, which may be spheroids, are not generally decelerated by the compression of a gas between the bodies.

SUMMARY OF THE INVENTION

It is an object of the present invention to provide a unidirectional energy converter in the form of a gravity engine wherein bodies are accelerated upwardly against the force of gravity by the expansion of a fluid medium in an expansion chamber so that the bodies are propelled to a height at which the velocity of the bodies approaches zero for collection the bodies at a laterally-displaced location in a stack where the potential energy of the bodies collected in the stack is imparted continuously as mechanical energy to the surface of a thrustor, such as a pocketed drive wheel at the bottom of the stack.

It is further object of the present invention to provide an improved form of a unidirectional energy converter in the form of a gravity engine wherein bodies are accelerated upwardly against the force of gravity by the expansion of gas in an expander that receives a charge of such a gas through valving controlled in a predetermined timed relation with the energy output from the engine.

In accordance with the present invention, an energy conversion apparatus is provided comprising a pair of generally, adjacent vertical passageways, a plurality of unconnected bodies movable within the passageway, means at the bottom portion of a first of the passageways for imparting a force to successive ones of the bodies to accelerate them upwardly in one passageway against the force of gravity, the magnitude of the force being great enough to cause successive ones of the bodies to reach the top of the first passageway, means at the top of the first passageway to direct the bodies to the top of the second passageway where they are permitted to descend along the second passageway, and means at the bottom of the second passagewy for converting at least a portion of the potential energy of the bodies stacked in the second passageway into another form of energy while directing the bodies to the bottom of the first passageway where they are again accelerated upwardly by imparting a force thereto.

In the gravity engine of the present invention, the vertical orientation of the movable bodies while under the influence of the force of gravity has the advantage that a minimum of guiding is required for the bodies which preferably take the form of spheroids. This minimizes guiding at higher velocities with the attendant result of reduced losses due to friction as well as minimizing noise and lubrication requirements. Positive valving for the intake charges of expansion gases into the expansion chamber enables the thrustor to operate against a lower average pressure whereby thrustor power losses are reduced to a fraction of that comparable to an unvalved expansion chamber. As desired, some of the kinetic energy of the bodies accelerated upwardly in the first passageway may be converted to electrical energy by using bodies made from magnetically-permeable material so that they cut and alter a magnetic field of a linear generator.

These features and advantages of the present invention as well as others will be more readily understood when the following description is read in light of the accompanying drawings, in which:

FIG. 2 is an elevational view, in section, of one embodiment of a gravity engine according to the present invention;

FIG. 3 is a sectional view taken along line III—III of FIG. 2;

FIG. 7 is a sectional view taken along line VII—VII of FIG. 6;

FIGS. 8, 9 and 10 illustrate details of certain parts of the control valve shown in FIG. 6; and FIG. 11 is a perspective view of a reversing loop runway for spheroids of the gravity engine of this invention.

Figure 1:
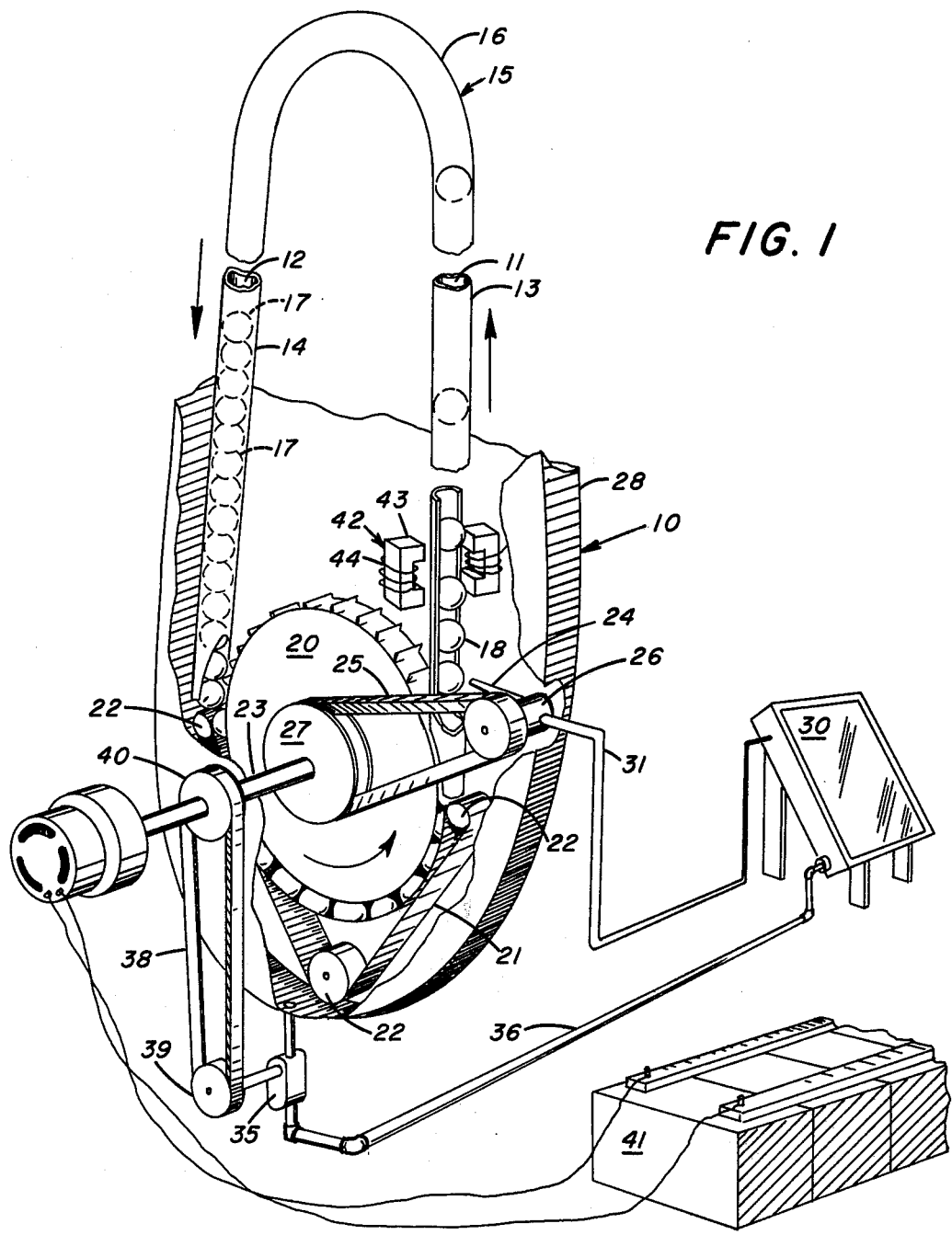
FIG. 1 is a perspective view, partly in cross section, illustrating the principles of a gravity engine according to the present invention.

In FIG. 1, there is shown diagrammatically a gravity engine 10 which, according to the present invention, employs the principle of a unidirectional energy converter engine. The gravity engine 10 includes a pair of generally adjacent, but laterally-spaced vertical passageways 11 and 12. These passgeways are defined by the openings formed within tubular housings 13 and 14, respectively, each having walls which are preferably smooth and formed from metal. A reverse loop passageway 15 has an inverted U-shaped configuration formed by a tubular housing 16 having walls which are preferably smooth and formed from a wear-resistant material, such as, for example, metal or Teflon (Trademark). Passageway 15 is used to form a smooth reverse loop interconnection between the upper ends of passageways 11 and 12. A plurality of solid pistons 17, shown as spheroids, is movable along a course of travel formed by passageways 11, 15 and 12. The cross-sectional shape of the passageways is larger than the spheroids. The tolerances or clearances between the surfaces of the spheroids 17 and the inside walls of the housing forming the passageways are such as to permit the spheroid to move freely along the course of travel without compressing air or other fluid medium along its course of travel within the passageways. An expansion chamber 18 for a fluid, such as a gaseous medium, is positioned at the lower end of a passageway 11. The expansion of the gaseous media in this chamber is used to accelerate each spheroid upwardly along the passageway 11 against the force of gravity to a height at which the velocity of the spheroid approaches zero. Thus, the clearances between the surfaces of the spheroids 17 and the inside walls of expansion chamber 18 must be small enough to prevent the expanding gaseous media from escaping past the spheroids and not imparting propelling force thereto. The course of travel by a spheroid along the passagewy 11 is such that at the height where the velocity approaches zero, the spheroid will pass into the passageway 15 which forms the means for directing the spheroid into the passageway 12 wherein it is collected at the top of a stack in passageway 12. As the spheroids are collected, they are allowed to impart the potential energy due to their elevated location continuously to the surface of a thrustor typically in the form of a pocketed wheel 20 located at the bottom discharge end of the passageway 12.

The pocketed wheel has circumferentially-spaced peripheral pockets adapted to receive the spheroids. The pocketed wheel together with a restraining means, such as an endless guide belt 21 trained around rollers 22 form a carrier for feeding the spheroids from the lower end of passageway 12 into the lower end of passageway 11. The pocketed wheel has a shaft 23 which becomes, in effect, a power-driven shaft by the moving weight of the spheroids in the stack along passageway 12. The need to guide the spheroids is minimized because of the vertical orientation for operation of the engine which is along lines parallel with the acceleration vector of the force of gravity. Only a minimum of spheroid guiding is required at higher velocities such as at the point where a spheroid is expelled from the expansion chamber. This has the advantage of reducing friction losses, wear, noise and lubrication requirements.

In accordance with the present invention, the fluid medium is introduced into the expansion chamber as a metered intake charge from a valve controlled in a timed relation with the energy output of the engine. For this purpose, as shown in FIG. 1, the engine 10 includes an endless belt 25 to interconnect a pulley secured to the control shaft of valve means 26 and a pulley 27 on the drive output shaft 23 of the thrustor. The intake charge of expansible gas is delivered from valve means 26 to expansion chamber 18 via pipe 24. Positive valving of the intake charge of expansible gas for the engine permits the expansion chamber pressure to decay during the expansion stroke so that the thrustor operates against a relatively low average pressure within the expansion chamber.

When, for example, steam is used to provide the charge of fluid medium introduced through the valve 26 into the expansion chamber, it is preferred to employ solar collectors to utilize solar energy to power a boiler. In FIG. 1, solar collectors 30 supply energy to heat water within the pipes of an underlying boiler and supply steam via line 31 to the valve 26. It is an important feature of the present invention to operate the gravity engine on a Rankine wet-steam cycle. Such a mode of operation is unique because the engine is powered by wet steam without inherent problems. The advantages of the wet-steam cycle in the gravity engine of the present invention are that the lower temperature source can be used, higher efficiencies are obtained, and a less costly fluid, e.g., water, can be used to transfer energy. When the gravity engine is operated on a wet-steam cycle, water condenses on the interior engine surfaces and this condensate provides a medium that is readily useful for sealing and lubricating a spheroid in the expansion chamber. Moderate temperatures and pressures are feasible for operation of the engine and the exterior case of the engine may be employed as a condenser in the ambient air to thereby avoid the need for employing a separate condenser.

It is advantageous to employ the integral solar collector and boiler for the gravity engine. In this way, a conventional separate heat exchanger between the collector and the gravity engine may be dispensed with to thereby avoid the attendant energy losses and cost disadvantages. Condensate water within the engine case 28 is pumped by a pump 35 via a return line 36 to the boiler section of the solar heating panel. The pump 35 is driven by a suitable power source such as, for example, by using a belt 38 trained around a pulley 39 on the pump shaft and pulley 40 on the drive output shaft of the thrustor. The drive output shaft 23 of the thrustor is coupled to a generator, for example, whereby the mechanical energy output from the engine is converted into electrical energy. The electrical energy may, of course, undergo further conversion by connecting the output terminals of the generator to a storage battery 41. FIG. 1 illustrates further means by which energy originating as heat or pressurized gas and converted into kinetic energy may be removed from the system embodied as a gravity engine. The spheroids may be made of magnetically-permeable material (e.g., iron or steel) capable of cutting and altering a magnetic field of a linear generator 42 located immediately above the expansion chamber. As shown in FIG. 1, the linear generator includes a yoke 43 forming a permanent magnet and having a winding 44 wound around a portion thereof. With this arrangement of parts, the spheroids formed from magnetically-permeable material will cut the lines of flux passing across the gap of the magnet and which intersect the path of travel of a spheroid at a point where it is at high velocity because of its close proximity to the discharge end of the expansion chamber. Each time a spheroid passes through the magnetic field, a pulse will be induced in the winding 44. This pulse, representing electrical energy, can be conducted to a load, not shown.

FIGS. 2 and 3 illustrate, in greater detail, one particular construction and arrangement of parts for utilizing the present invention. It will be understood, of course, that the parts illustrated and described hereinafter in regard to FIGS. 2 and 3 correspond in principle and operation to the parts already described in regard to the gravity engine shown in FIG. 1.

In FIGS. 2 and 3, the gravity engine 49 includes a base plate 50 to support and stabilize a casing 51 which has a hollowed-out interior wherein there is located a pocketed wheel assembly 52. The pocketed wheel assembly includes a wheel 53 having circular recesses uniformly spaced about its outer periphery and adapted to receive a succession each of the plurality of spheroids 54. The spheroids pass into the recesses in wheel 53 from a vertically-stacked column within a standpipe 55 having guide rails 55A or the like for directing the spheroids under the influence of gravity toward the pocketed wheel assembly. As is apparent, the standpipe 55 essentially corresponds to the housing forming passageway 12 shown in FIG. 1. The standpipe 55 has a flange secured to a top cover forming part of the casing 51. The pocketed wheel assembly is carried by a drive output shaft 56 supported by bearings mounted in a tubular member that projects from one side of the engine casing as shown in FIG. 3. The pocketed wheel assembly 52 further includes discs 57 carried by the shaft 56 at the opposite sides of the wheel 53. The discs have teeth projecting from their outer peripheries for driving engagement with flexible endless chains 58 and 59. Carries plates 60 extend between the chains at spaced locations corresponding to projected spacing between the pockets formed in the wheel 53 for supporting the spheroids while transported by the wheel assembly 52. The chains encircle the lower portions of the discs and thence wrap around sprockets 61 and 62 carried by shafts at opposite sides of the engine. Sprockets 63 are supported by a shaft 64 below the discs to facilitate guiding of the chains along their return run. The shaft 64 is supported by bearings in a tubular casing that projects from the casing 51.

As shown in FIG. 3, the shaft 64 extends from the projected end of the casing where the shaft carries a pulley coupled by a belt 65 to a pump 66 for withdrawing condensate water that accumulates in the lower portion of the casing 51. This water is fed to a boiler or the like. An engine brake may take the form of a wedge or a friction-type brake strap 67. The strap 67 encircles a major portion of the peripheral surface of a brake drum 67A located between the sprocket wheels 61. A braking force is applied to the drum by a lever 68 interconnecting the ends of the brake strap. When the brake is released, the pocketed wheel assembly 52 is driven by the moving weight of the spheroids stacked within the standpipe 55. The spheroids are carried in succession by the pocketed wheel assembly 52 for entrance into a steam chest 70. The spheroids enter an expander tube 72, located within the steam chest, through an opening in the cover of the casing 51. A pipe 71 supplies steam from a boiler, for example, to the interior of the steam chest. The expander tube 72 extends vertically from the floor of the steam chest through the top surface thereof and receives the spheroids discharged from the pocketed wheel assembly.

The passage of steam or other expansible gas into the expander tube is controlled by valve means which, as shown in FIGS. 2 and 3, may typically take the form of a vertically-movable sleeve 73 encircling the outer surface of the expander tube at its lower end. The sleeve is lifted vertically to expose one or more portal openings 73A in the side wall of the expander tube. For this purpose, the sleeve 73 is lifted by a system of levers 74. These levers are moved in response to a control arm 75 having a cam follower 76 positioned by the arm into contact with the surface of a cam 77. The cam is driven through the action of two gears, with one gear mounted on the support shaft for the cam and the other gear (the drive gear) mounted on a shaft connected to sprockets 62. The expansion of the gas, introduced into the expander tube from the steam chest, imparts a force to a spheroid within the expander tube 72 to accelerate it in an upward direction along the expander tube where it passes from the end of the tube through a pressure release opening so that a forward pressure on the spheroids is released before the spheroid passes vertically along a standpipe 78. While not shown in FIGS. 2 and 3, it will be understood, of course, that suitable means such as the U-shaped housing 16 or reversing loop runway, as described hereinafter is provided for directing a spheroid from the upper end of standpipe 78 to the upper end of standpipe 55.

Thus, according to the present invention, there is provided a gravity engine to convert the potential energy of a stack of spheroids into shaft torque through the use of a thrustor wheel at the bottom of the stack of spheroids. The guide rails 55A form extensions to the tubular housing 55 or 14 to direct the spheroids into contact with the thrustor wheel.

It is contemplated that, in its simplest form, two spaced circular rails will effectively hold the spheroids within the pockets of the thrustor wheel while the spheroids are transferred thereby from the bottom of the vertical stack to the inlet of the expander. However, sliding friction between the spheroids and the circular rails represents an energy loss of at least 10% to the energy output of the engine. This sliding friction also accelerates wear on the circular rails and the spheroids.

The weight of the spheroids imposes a reactive force upon the thrustor wheel and upon the guide rails. The imposed reactive force upon the thrustor wheel is translated into shaft torque while the reactive force imposed upon the stationary guide rails is dissipated in the form of heat generated by sliding movement of the spheroids on the guide rails. The amount of energy lost depends on the friction characteristics of the rubbing surfaces and lubrication.

A chain-type conveyor, as disclosed in FIGS. 2 and 3, will eliminate most friction and wear while transferring the spheroids from the stack to the expander inlet. However, the chain conveyor requires three additional drive shafts that must either operate within the engine case or extend through the case and require suitable shaft seals.

Figure 5:
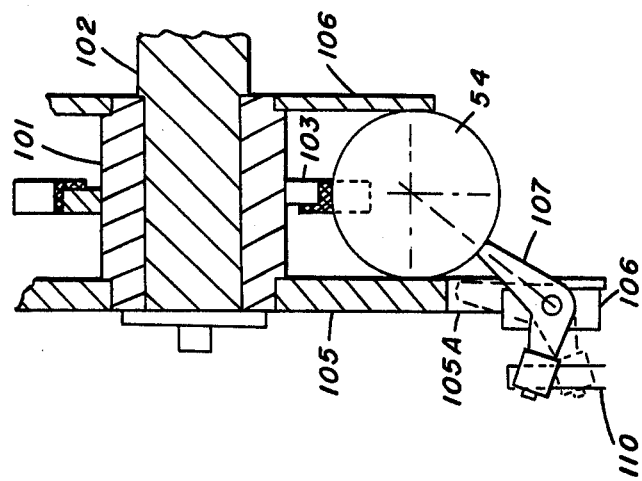
FIG. 5 is a sectional view taken along line V—V of FIG. 4.
Figure 4:
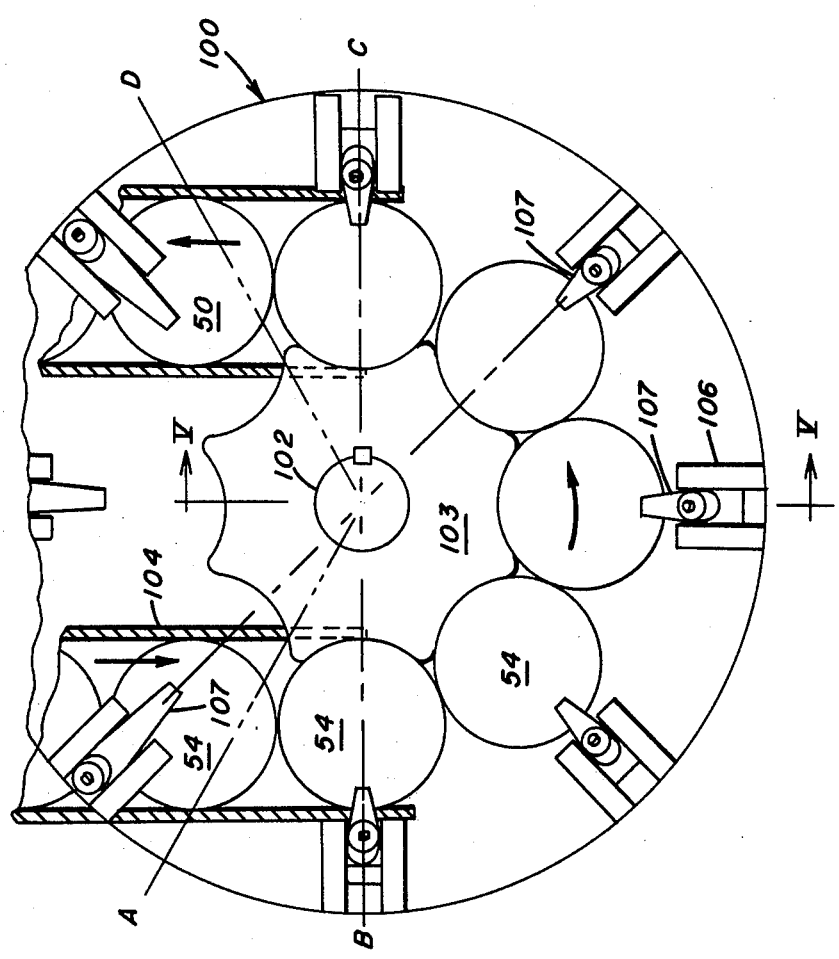
FIG. 4 is an enlarged view of a preferred form of thrustor wheel forming part of the gravity engine of this invention.

An alternative and preferred transfer mechanism for the spheroids is shown in FIGS. 4 and 5. This mechanism eliminates the chain, sprockets and drive shafts in a chain conveyor. The transfer mechanism essentially includes a thrustor wheel 100 having a hub 101 keyed to a drive output shaft 102. The hub 101 carries a wheel 103 having pockets in the form of circular recesses spaced about its outer periphery to receive in succession the spheroids 54 from the discharge end of a tubular stack guide 104. As shown in FIG. 5, the hub also carries disc-like side plates 105 and 106 spaced from the sides of wheel 103 at a predetermined distance. The plates 105 and 106 each has a diameter larger than the diameter of wheel 103 so that a spheroid assumes a nested relation wherein it is supported between the side plates while located within a pocket of the wheel 103. Side palte 105 has a radial slotted opening 105A formed at each of spaced-apart locations about the periphery of the side plate. Each slotted opening is bounded at both sides by clevis plates 106. A latch plate 107 is pivotally carried by a pin extending between the clevis plates for movement into and out of the space between the side plates 105 and 106. Opposed cam surfaces, formed by a slot in a cam plate 110, are engaged by a roller mounted on the projected end of each latch. As the thrustor wheel rotates from point A to point B, a spheroid is transferred from the stack guide into the space between the side plates where it passes into engagement with the pocketed wheel 103. During this time, a latch located in an unlatched position, shown in FIG. 5 by phantom lines, is moved by the cam 110 to a latched position. The spheroid is held against the pocketed wheel by the latch and restrained as to lateral movement by the side plates while the spheroid is transferred to the inlet of the expander at position C.

Release of the spheroid by the latch from the pocketed wheel is started at the position C through the action of the stationary cam. The cam moves the latch to the phantom-line position by the time the latch is moved by the thrustor wheel to position D. The action of the cam is to move the latch from the operative position wherein a leg of the latch projects into the space between the side plates 105 and 106 into the phantom-line position wherein the same leg is confined within the slot 105A in side plate 105. The cam is designed so that the latch is retracted when located at position D. At this position, the spheroid is free for guided movement out of the pocketed wheel 103 beyond the latch into the expander tube. The latch is held in the unlatched position by the cam until the latch is carried into position A where the latch is again moved by the cam into a latching relation with a spheroid at the discharge end of the stack guide 104. If desired, side plate 106 or both of the side plates 105 and 106 may be used to support latches in the same manner for control by one or more cams in light of the foregoing description.

FIGS. 6–10 illustrate, in greater detail, the construction of parts forming the steam chest 70, expander tube 72 and the valve means. The steam chest 70 is an enclosed casing having upper and lower side walls 70A and 70A, each provided with an annular opening 70C adapted to receive the expander tube 72. The steam chest surrounds the expander tube so as to enclose the portal opening 73A. This opening is actually an elongated slot in the side wall of the expander tube transversely to its extended length. In the embodiment shown, movable valve 120 has the form of an arcuate segment of a sleeve which encloses approximately 180° of the face surface of the expander tube. Alternative valve designs employing a flat plate rather than an arcuate segment are also possible. The movable valve has an elongated slot 121 alignable with the slot 73A for the passage of steam from the steam chest into the expander tube as indicated by arrows in FIGS. 6 and 7. As previously described in regard to FIGS. 2 and 3, the valve is moved vertically by a cam coupled to a system of levers which includes a lever 122. One end of this lever is secured to a pivot shaft 123 while a clevis 124 is formed on the other end. The lever 122 is reciprocated vertically with an oscillating motion by shaft 123 through the action of the cam 77 and cam follower 76. A guide block 125 is secured by a pivot shaft 126 within the clevis 124 so that the upper and lower surfaces of the guide block contact, for relative sliding movement, projecting flanges 127 forming part of the movable valve 120. Arcuate shoes 128 are resiliently urged by springs 129 toward the valve 120 which is thereby pressed tightly against the outer face surface of the expander tube.

As shown in FIGS. 8-10, the springs 129 are retained on guide pins 130 carried by a bracket 131. This bracket includes projecting wings 132 along its upper and lower edges whereby the bracket actually forms an enlarged clevis that is secured in an overlying relation to clevis 124 by pin 126.

Figure 6:
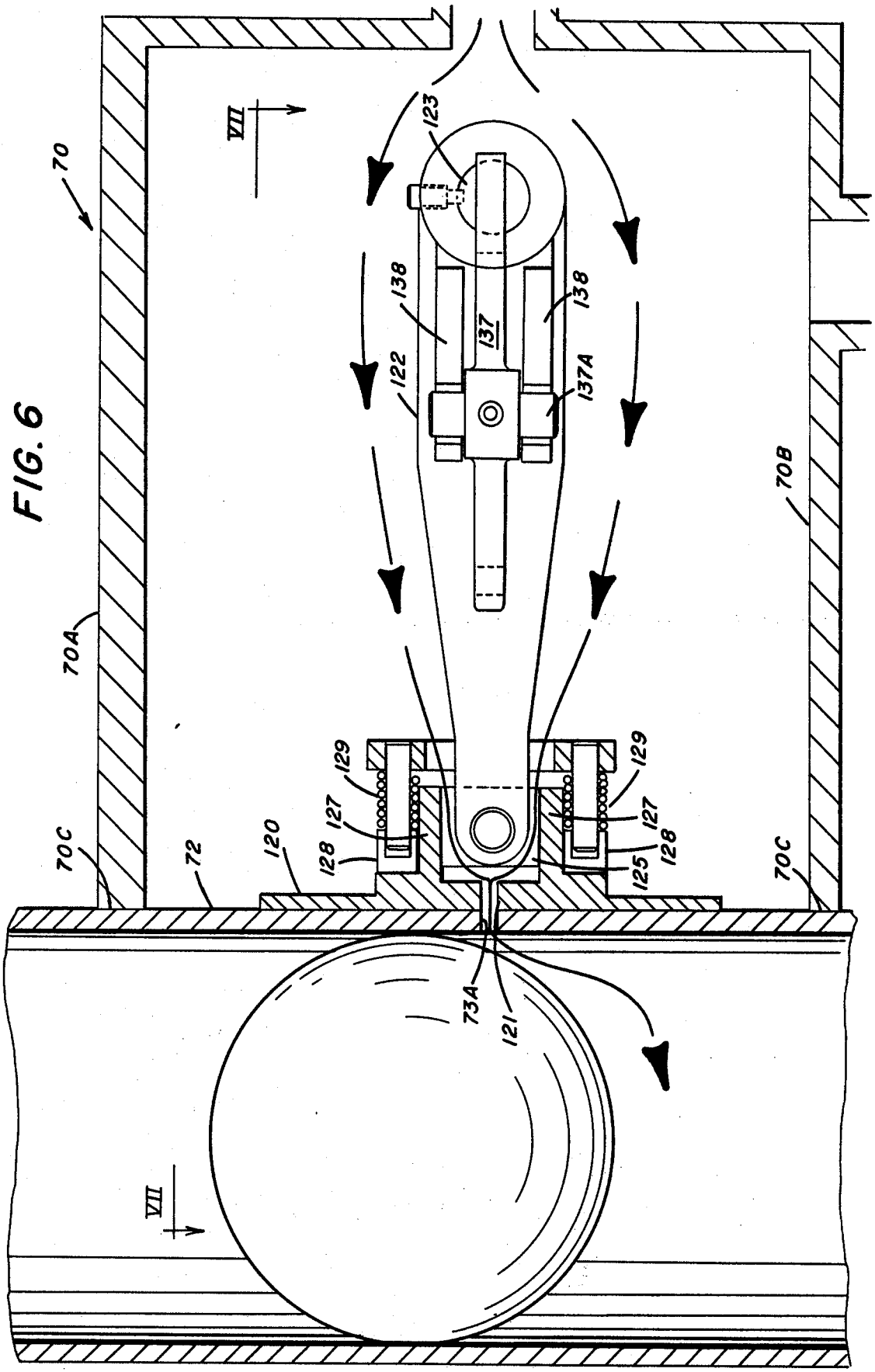
FIG. 6 is an enlarged view of a preferred form of steam chest and control valve for the gravity engine of this invention.

FIGS. 6 and 7 also illustrate a throttle control employed to independently rotate the movable valve plate 120 about the periphery of the expander tube through an angle of, for example, 45° at either side of an aligned relation between the slots 121 and 73A. The apparatus forming the throttle includes a shaft 135 carried within a bore formed in shaft 123. Shaft 135 extends through the steam chest where it is coupled to a control lever, not shown. Shaft 135 carries a clevis 136 having a clevis pin passed within the slotted opening of a bell crank 137. The central portion of the bell crank is carried by a pivot pin 137A which is, in turn, supported by arms 138 extending from the lever 122. A connector rod 139 is joined at one end to the bell crank and, at the other end, a pin 140 secures the connecting rod between the projecting flanges 127. The connecting rod is secured to these flanges at an extreme end of the movable valve 120 whereby the valve can rotate about the peripheral surface of the expander tube to vary the amount of overlap between the slots 73A and 121 in the expander tube and the valve plate, respectively.

During operation of the gravity engine, the working fluid is delivered into the expander tube in a timed relation with the movement of the individual spheroids as they are forced upwardly into the expander tube by the thrustor wheel. The valving system is driven by the torque output shaft of the engine. This output shaft drives the cam shaft on which the cam is positioned to operate the cam follower on the end of a lever. This lever forms part of the lever system and includes lever 122 used to reciprocate the movable valve in a slideable manner vertically along the exterior surface of the expander tube. The slotted opening in the movable valve coincides with the similar slotted opening in the expander tube at about midstroke of the valve plate. During the time when the slot in the valve plate communicates with the slot in the expander tube, pressurized steam from the steam chest enters the expander tube through the coinciding slots. One pressurized emission of steam occurs during the upstroke of the valve plate and another emission of steam occurs during the downstroke of the valve plate. Therefore, two shperoids are launched during each revolution of the cam shaft.

As previously described in regard to FIG. 1, the spheroids are projected in succession from the expander along the passageway 11 against the force of gravity to a height at which the velocity of the spheroid approaches zero. Along the course of travel by a spheroid, passageway 15 forms a means for directing the spheroid into the passageway 12 wherein it is collected in the top of a stack of spheroids. Typically, an elbow or inverted U-shaped tube is located at the upper end of the launch tube above the expander for directing the spheroids from the launch tube to the upper end of the tube wherein the spheroids are stacked. When the engine is not operative, the tube in which the spheroids are stacked will be approximately filled with spheroids. However, when the engine is running, a significant number of spheroids is, at any given time, in flight. During operation of the engine, only spheroids present in a stacked formation exert the motivating force upon the torque output shaft of the engine. Therefore, it is desirable to maintain the largest possible number of stacked spheroids to impose the greatest weight upon the pocketed wheel at the bottom of the stack for a given height of a permanent engine structure.

According to a preferred embodiment of the present invention, an auxiliary track section is provided at the discharge end of the launch tube. Such a track section is shown in FIG. 11 wherein a track for the spheroids is in the form of a spirally-shaped runway 140 having a flat lateral angle to collect the equivalent number of spheroids that is in flight while the engine is in operation. The circular spiral of the runway conserves both material and space within the engine. Moreover, a circular spiral configuration minimizes the vertical distance through which the spheroids must fall before contacting the uppermost spheroid in the stack. This minimizes the velocity at which the falling spheroids will attain before impact with the top spheroid in the stack. As shown in FIG. 11, the spirally-shaped runway 140 consists of a spiral floor with upstanding sides 141 and 142 that are spaced from each other by a distance slightly greater than the diameter of the spheroid 54. The spheroids enter the runway through a duct-like tube 143 having an L-shaped configuration and secured at its lower end to the launch tube. A discharge tube 144 communicates with the tube containing the stack of spheroids. Tubes 143 and 144 are laterally spaced from each other and offset from the axis of the spiral runway which is defined by a support shaft 145. It will be understood, of course, that within the engine case itself, a top cover is provided for the spiral runway.

Economical success of the engine according to the presention invention is dependent upon the selection of inexpensive but relatively heavy spheroids having the required dimensional tolerances. A relatively large number of heavy spheroids is required in an engine to produce a given power output. While the spheroids may be manufactured in any desired manner, it is preferred to fabricate a shell that is subsequently filled with a low-cost dense material such as compacted steel or iron turnings, sand, lead, such as derived from refused auto batteries, and the like. Stampings of sheet steel may be used to form hemispheric shells which are welded together together to form a hollow spheroid. The spheroid must be filled with dense material to obtain the needed weight. A hollow spheroid can also be fabricated from two molded plastic hemispheres which are joined to form a hollow spheriod that is subsequently filled with dense material. Steel balls may be employed that are either solid or hollow but it is desirable to coat or encase the outer surface of the selected spheriod with a plastic or elastomeric material suitable to withstand the temperatures encountered within the engine and to minimize any impact of the spheroids one upon the other during operation.

As previously described, the exhaust from an expanded charge of fluid medium is passed directly into the interior of the engine case. The engine case is preferably maintained at a subatmospheric pressure by evacuating and sealing the engine case at assembly. The exhausted material, e.g., water vapor and water mixture, is then condensed fully to a liquid state by the cooling action of the engine case. Since the engine case is necessarily large due to the required components therein, the engine case provides a large surface area for cooling. The result is that the internal condensing function is achieved solely by the engine case utilizing ambient temperature conditions. This eliminates the need for a separate condenser unit as required on many Rankine-cycle engines. The cooling effectiveness can be augmented by providing cooling fins extending from the engine case.

The unidirectional energy converter engine of the present invention utilizes inexpensive, plentiful and enviornmentally natural water as the preferred form of working fluid. Other solar engines utilize either (1) Freon (Trademark), which is costly, unstable and may be harmful to the earth's ozone layer, or (2) various hydrocarbons such as propane, butane, methane, etc. which are almost exclusively explosive, corrosive, toxic and present material handling problems. By employing steam, the engine of the present invention has a high-cycle efficiency without requiring an expensive and bulky regenerator to obtain this high efficiency as required by most other solar engines. The high efficiency is based on the ability to expand into a two-phase, liquid-vapor dome which permits adding almost all the input cycle heat and rejecting all the waste cycle heat at constant temperatures. In other words, the Carnot-cycle. This "wet" steam cycle has a higher efficiency than conventional dry steam cycles and even a higher efficiency than organic fluid Rankine-cycles. The expander provides the unique feature of permitting the utilization of heretofore unusable but high efficiency steam cycles. The expansion of wet steam in the spheriod-tube expander avoids water erosion problems in a steam turbine expander and condensation and compression problems in a steam piston or rotary vane expander that are encountered when a wet steam cycle is used in conventional steam powered engines or turbines.

The present invention eliminates the regenerator because the wet-steam cycle expands into a two-phase, liquid-vapor dome and not into a superheat region. A regenerator is not needed to recover waste expansion energy in order to maintain an acceptable cycle efficiency which is necessary with other steam engines or turbines that must operate on a dry-steam cycle.

The low-pressure solar powered gravity engine of the present invention is suitable, because of the non-hazardous working fluid, for use in the home and in other areas where a high pressure engine with hazardous working fluids is unacceptable. The high condensing temperature, e.g., 140° F, of the gravity engine simplifies condensing requirements. By employing fins on the outer surface of the engine casing, adequate condensing is readily available by using natural convection cooling from the surrounding ambient air. This is in contrast to condensing temperatures of 80° to 90° F specified for many other solar engines so as to increase the cycle efficiency. This necessarily requires the use of fan-driven air condensers or a tube-shell type water condenser.

The vertically-arranged spheriod expander tube has a low friction and a minimum of lubrication requirements. This capability minimizes fouling or contamination of solar collectors and heat exchangers by a lubricant. Moreover, the construction and arrangement of parts for the gravity engine render the use of seals, rings, and tight clearances between parts unnecessary because the wet-steam aids in sealing the clearance space between the spheroids and the expander tube. It has been found that the gravity engine is operable by using steam-vapor pressure of 67 psia at 300° F which is available from advanced designs of flat-plate type solar collectors. This capability permits the steam to be vaporized directly within the solar collector, thereby eliminating a separate boiler. Moreover, an intermediate boiler is necessary in certain solar engines due to the high vapor pressure of the working fluid at 300° F which is set forth in the following table:

TABLE

| Working Fluid | Vapor Pressure at 300° F |
| --- | --- |
| Freon 11 | 300 psia |
| Freon 113 | 176 psia |
| Butane | 525 psia |
| Isobutane | Critical pressure to 529 psia at critical temperature 275° F |

Eliminating the boiler also serves to increase the expander inlet temperature by 10° to 20° F, which further increases the cycle efficiency and thereby decreases the size of the required solar collector. A boiler feed pump is, of course, eliminated.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. Energy conversion apparatus comprising a pair of generally adjacent vertical passageways, a plurality of bodies freely movable within said passageways, a fluid medium expander means at the bottom portion of a first of said passageways for imparting a force to successive ones of said bodies to accelerate them upwardly in said one passageway against the force of gravity, the magnitude of said force being great enough to cause successive ones of the bodies to reach the top of the first passageway, means at the top of said first passageway to direct said bodies to the top of the second of said passageways where they are stackes and permitted to descend by gravity in the second passageway, and means at the bottom of the second passageway for converting at least a portion of the potential energy of bodies falling in the second passageway to another form of energy while directing said bodies to the bottom of said first passageway where they are again accelerated upwardly by imparting a force thereto.

2. The energy conversion apparatus according to claim 1 wherein said means at the bottom portion of a first of said passageways includes an expansion chamber for expanding a fluid medium to impact a force to successive ones of said bodies.

3. The energy conversion apparatus according to claim 2 further comprising valve means for controlling the introduction of the fluid medium into said expansion chamber.

4. The energy converison apparatus according to claim 3 further comprising means to control said valve means in a predetermined timed relation with said means at the bottom of the second passageway which includes a thrustor wheel for converting at least a portion of the potential energy.

5. The energy conversion apparatus according to claim 1 further comprising valve means controlled by said means at the bottom of the second passageway for supplying an expansible fluid medium to said means at the bottom of the first passageway.

6. The energy conversion apparatus according to claim 2 wherein each of said bodies is of a shape substantially complementary to the cross-sectional shape of said expansion chamber.

7. The energy conversion apparatus according to claim 1 wherein at least one exhaust chamber at lower pressure is provided to reduce the pressure in front of the bodies and promote their acceleration essentially along said first passageway.

8. The energy conversion apparatus according to claim 1 wherein said means at the bottom of the second passageway for converting potential energy of the descending bodies includes a wheel having circumferentially-spaced peripheral pockets for receiving said bodies from the lower end of said second passageway.

9. The energy conversion apparatus according to claim 8 wherein said means at the bottom of the second passageway further includes an endless belt arranged to encircle a portion of the periphery of said wheel for retaining the bodies received in the pockets thereof while directing said bodies to the bottom of said first passageway.

10. The energy conversion apparatus according to claim 8 wherein said means at the bottom of the second passageway further includes at least one flexible endless member arranged to encircle a portion of the periphery of said wheel, and means carried by said flexible endless member for retaining the bodies received in the pockets of said wheel while the bodies are transported thereby to the bottom of said first passageway.

11. The energy conversion apparatus according to claim 2 further including an enclosure in communication with said expansion chamber, and valve means to control the supply of fluid medium from said enclosure into said expansion chamber from imparting a force to successive ones of the bodies.

12. The energy conversion apparatus according to claim 1 wherein said generally adjacent vertical passageways include vertical standpipes, said apparatus further including casing means for supporting said standpipes at spaced-apart locations.

13. The energy conversion apparatus according to claim 8 wherein said means at the bottom of the second passageway further includes means to retain the bodies within the pockets of said wheel while the bodies are carried from the lower end of said second passageway to the bottom of said first passageway.

14. The energy conversion apparatus according to claim 8 wherein said means at the bottom of the second passageway further includes members at opposite sides of said wheel for support of the bodies while carried within the pockets of said wheel.

15. The energy conversion apparatus according to claim 10 wherein said means at the bottom of the second passageway further includes latches carried by at least one of said members at each of spaced-apart locations to retain the bodies between said members and within a pocket of said wheel while the bodies are directed to the bottom of said first passageway from the lower end of said second passageway.

16. The energy conversion apparatus according to claim 15 wherein said means at the bottom of the second passageway further includes means carried by at least one of said members for pivotally supporting each of said latches, and cam means to move said latches into and out of a position for retaining the bodies between said member and within pockets of said wheel.

17. The energy conversion apparatus according to claim 16 wherein said members are disc-like side plates each having a diameter larger than the diameter of said wheel.

18. The energy converstion apparatus according to claim 1 wherein said means at the bottom portion of a first of said passageways for imparting a force includes a steam chest means for supplying steam into said steam chest, an expander tube having a portal opening for receiving steam from said steam chest, and valve means movable along said expander tube within said steam chest to control the passage of steam through the portal opening in said expander tube.

19. The energy conversion apparatus according to claim 18 wherein said valve means includes a sleeve-like member having a portal opening for conducting steam to the portal opening in said expander tube, and means to reciprocate said sleeve-like member relative to said expander tube for cyclic alignment of the portal openings therein.

20. The energy conversion apparatus according to claim 19 wherein said valve means further includes resilient means to urge said sleeve-like member into engagement with said expander tube.

21. The energy conversion apparatus according to claim 19 wherein said means to reciprocate includes a lever having a clevis at one end thereof, a guide block supported for pivotal movement by said clevis, and means extending from said sleeve-like chamber along opposite sides of said guide block for relative sliding movement therebetween.

22. The energy conversion apparatus according to claim 19 further comprising throttle means connected to said sleeve-like member for controlling the position of the portal opening therein relative to the portal opening in said expander tube.

23. The energy conversion apparatus according to claim 1 wherein said means at the bottom portion of a first of said passageway includes an expansion chamber for an expansible fluid medium and throttle means to control the force imparted to successive ones of said bodies by the expansible fluid in said expansion chamber.

24. The energy conversion apparatus according to claim 1 wherein said means at the top of said first passageway to direct said bodies to the top of the second of said passageway includes a spirally-shaped runway.

25. The energy conversion apparatus according to claim 24 wherein said spirally-shaped runway defines a flat, lateral angle to collect bodies in flight while passing to the top of the second of said passageways.

26. The energy conversion apparatus according to claim 24 wherein said spirally-shaped runway includes a spiral floor with upstanding sides spaced from each other by a distance slightly greater than the diameter of said bodies, and means to deliver and receive bodies from said runway.

27. The energy conversion apparatus according to claim 1 wherein said bodies are further defined to include spheroids.

28. The energy conversion apparatus according to claim 27 wherein said spheroids include an outer coating to withstand elevated temperatures within said passageways and impact by the spheroids.

29. The energy conversion apparatus according to claim 27 wherein said spheroids are joined to hemispheric shells filled with dense material.

* * * * *